United States Patent
Guo et al.

(10) Patent No.: US 9,508,118 B2
(45) Date of Patent: Nov. 29, 2016

(54) METHOD AND APPARATUS FOR PROCESSING IMAGE

(71) Applicant: TENCENT TECHNOLOGY (SHENZHEN) COMPANY LIMITED, Shenzhen (CN)

(72) Inventors: Antai Guo, Shenzhen (CN); Bo Ren, Shenzhen (CN); Yu Gao, Shenzhen (CN); Yang Yang, Shenzhen (CN); Yinsong Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/104,563

(22) PCT Filed: Jun. 24, 2015

(86) PCT No.: PCT/CN2015/082176
§ 371 (c)(1),
(2) Date: Jun. 15, 2016

(87) PCT Pub. No.: WO2015/196989
PCT Pub. Date: Dec. 30, 2015

(65) Prior Publication Data
US 2016/0321780 A1  Nov. 3, 2016

(30) Foreign Application Priority Data
Jun. 25, 2014 (CN) .......................... 2014 1 0295073

(51) Int. Cl.
*G06K 9/42* (2006.01)
*G06K 9/44* (2006.01)
*G06T 3/00* (2006.01)
*G06T 3/40* (2006.01)

(52) U.S. Cl.
CPC ............... *G06T 3/0093* (2013.01); *G06T 3/40* (2013.01)

(58) Field of Classification Search
None
See application file for complete search history.

(56) References Cited

U.S. PATENT DOCUMENTS

| 6,084,598 A | 7/2000 | Chekerylla |
|---|---|---|
| 8,218,899 B2 | 7/2012 | Yamazaki et al. |

(Continued)

FOREIGN PATENT DOCUMENTS

| CN | 101378444 A | 3/2009 |
|---|---|---|
| CN | 102546899 A | 7/2012 |
| CN | 102750666 A | 10/2012 |

OTHER PUBLICATIONS

Contrast stretching, by Perkins et al., copyright 2003, http://homepages.inf.ed.ac.uk/rbf/hipr2/stretch.htm pp. 1-5.*

(Continued)

*Primary Examiner* — Vikkram Bali
(74) *Attorney, Agent, or Firm* — Marshall, Gerstein & Borun LLP

(57) ABSTRACT

The method of the present disclosure includes: acquiring a pair of operation control points including an operation start point and an operation end point; calculating a vector from the operation start point to the operation end point; determining an image deforming area, where the image deforming area consists of a contracted sub-area and a stretched sub-area; determining a pixel step value of each pixel in the image deforming area, where a pixel step value of a pixel in the contracted sub-area is greater than a preset step value threshold, and a pixel step value of a pixel in the stretched sub-area is less than the step value threshold; generating an offset parameter relative to the image according to a vector direction of the vector and the pixel step value of the pixel; and performing interpolation calculation on the offset parameter, to obtain a stretched image.

16 Claims, 9 Drawing Sheets

(56) References Cited

U.S. PATENT DOCUMENTS

2003/0098872 A1    5/2003   Georgiev
2015/0022631 A1*   1/2015   Chang ................ H04N 13/0033
                                                                                               348/43
2015/0379666 A1* 12/2015   Redzic ...................... G06T 1/20
                                                                                              345/646

OTHER PUBLICATIONS

International Search Report and Written Opinion, International application No. PCT/CN2015/082176, mailed Oct. 10, 2015.

* cited by examiner

METHOD AND APPARATUS FOR PROCESSING IMAGE

CROSS-REFERENCE TO RELATED APPLICATION

This application is a national phase of International Application PCT/CN2015/082176 filed on Jun. 24, 2015, which claims benefit of and priority to Chinese Patent Application No. 201410295073.8 filed on Jun. 25, 2014 entitled "Method and Apparatus for Processing Image". The entire disclosures of each of the above applications are incorporated herein by reference.

FIELD OF THE TECHNOLOGY

The present disclosure relates to the field of Internet technologies, and in particular, to a method and an apparatus for processing an image.

BACKGROUND OF THE DISCLOSURE

With the popularity and use of various image optimization applications, image processing functions of terminals such as mobile phones and computers become increasingly richer. Among others, there is a novel function called an image deforming technology, which enables a user to perform an operation such as stretching or twisting on some areas of an image, so as to change the original layout and structure of content of the image to meet different use requirements. For example, for a head portrait photo, the user may stretch the human face by using the image deforming technology, to achieve an image effect similar to a "distorting mirror".

In the image deforming technology, space mapping is a core means used to change image structure. By using space mapping processing, a terminal maps pixels in some areas of an original image to other positions in a deformed image by means of displacement mapping, so as to obtain a pixel position relationship in the deformed image that is different from that of the original image, thereby achieve an objective of changing the image structure. In current production practice processes, according to different space mapping manners, the image deforming technology is mainly divided into three types: 1. block-based image deforming; 2. line-based image deforming; and 3. point-based image deforming. The main concept of the block-based image deforming manner is to divide a deforming area into multiple image blocks, perform space mapping on the different image blocks according to different offset amounts, and combine the image blocks after the space mapping; the main concept of line-based image deforming is to construct a series of characteristic lines in a deforming area, obtain through calculation an offset amount of each pixel according to distances from pixels to the characteristic lines, and perform space mapping on the deforming area according to the offset amounts obtained through calculation; the main concept of point-based image deforming is to construct a series of discrete characteristic points in a deforming area, and implement space mapping on the deforming area by specifying a mapping relationship between special characteristic points and using an appropriate radial basis function.

No matter for block-based deforming, line-based deforming or point-based deforming, the existing technology needs to determine, based on specific content of the image, the number and distribution of characteristic quantities before space mapping, for example, how many image blocks the image is divided into, how to determine a position of an image block, and so on. To ensure smoothness and a stability boundary after image deforming, generally the content of the image needs to be analyzed by using a complex algorithm, which leads to a massive amount of calculation, and causing the image deforming process to take too much time. Especially when a higher-order function is used in the image analysis or space mapping process, the amount of calculation further increases, which cannot adapt to real-time response requirements on the terminal.

SUMMARY

Embodiments of the present invention provide a method and an apparatus for processing an image, and can solve the problem of large amount of calculation in an image deforming process.

According to one aspect, an embodiment of the present invention provides a method for processing an image, including:

acquiring a pair of operation control points, the pair of operation control points including an operation start point and an operation end point, and being used to stretch the image;

calculating a vector from the operation start point to the operation end point;

determining an image deforming area by using a middle point of a vector length of the vector as a center, the image deforming area covering the operation start point and the operation end point, an area that starts from a start border that is a vertical line on which the operation start point is located and extends toward a vector direction of the vector to a border of the image deforming area being a contracted sub-area, and an area that starts from the start border that is the vertical line on which the operation start point is located and extends in a direction opposite to the vector direction of the vector, to another border of the image deforming area being a stretched sub-area;

determining a pixel step value of each pixel in the image deforming area, a pixel step value of a pixel in the contracted sub-area being greater than a preset step value threshold, a pixel step value of a pixel in the stretched sub-area being less than the step value threshold, and an integral value of the pixel step value in the contracted sub-area being equal to an integral value of the pixel step value of the pixel in the stretched sub-area;

generating an offset parameter relative to the image according to the vector direction of the vector and the pixel step value of the pixel; and performing interpolation calculation on the offset parameter, to obtain a stretched image.

According to another aspect, an embodiment of the present invention further provides an apparatus for processing an image, including:

an instruction acquiring unit, configured to acquire a pair of operation control points, the pair of operation control points including an operation start point and an operation end point, and being used to stretch the image;

a vector calculation unit, configured to calculate a vector from the operation start point to the operation end point for the pair of operation control points that are acquired by the instruction acquiring unit;

an area defining unit, configured to determine an image deforming area by using a middle point of a vector length of the vector calculated by the vector calculation unit as a center, the image deforming area covering the operation start point and the operation end point, an area that starts from a start border that is a vertical line on which the operation start point is located and extends toward a vector direction of the vector to a border of the image deforming area being a contracted sub-area, and an area that starts from the start border that is the vertical line on which the operation start point is located and extends in a direction opposite to the vector direction of the vector, to another border of the image deforming area being a stretched sub-area;

a step value determining unit, configured to determine a pixel step value of each pixel in the image deforming area determined by the area defining unit, a pixel step value of a pixel in the contracted sub-area being greater than a preset step value threshold, a pixel step value of a pixel in the stretched sub-area being less than the step value threshold, and an integral value of the pixel step value in the contracted sub-area being equal to an integral value of the pixel step value of the pixel in the stretched sub-area;

a parameter generation unit, configured to generate an offset parameter relative to the image according to the vector direction of the vector calculated by the vector calculation unit and the pixel step value of the pixel that is determined by the step value determining unit; and an interpolation calculation unit, configured to perform interpolation calculation on the offset parameter generated by the parameter generation unit, to obtain a stretched image.

By means of the method and apparatus for processing an image that are provided in the embodiments of the present invention, a pair of operation control points on a to-be-deformed image is acquired according to an operation instruction of a user, where the pair of operation control points includes an operation start point and an operation end point; then, a vector from the operation start point to the operation end point is calculated; and an image deforming area that covers the operation start point and the operation end point is determined in the to-be-deformed image by using a middle point of a vector length of the vector as a center, where the image deforming area is divided into a contracted sub-area and a stretched sub-area. A pixel step value of each pixel in the image deforming area is determined, where a pixel step value of a pixel in the contracted sub-area is greater than a preset step value threshold, and a pixel step value of a pixel in the stretched sub-area is less than the step value threshold; then, an offset parameter relative to the image is generated according to a vector direction of the vector and the pixel step value of the pixel, and interpolation calculation is performed on the offset parameter, to obtain a stretched image.

Compared with the existing technology, in the embodiments of the present invention, the acquired operation control points are obtained through triggering by the user, and a terminal does not need to analyze specific content of the image, and does not need to determine the number and distribution of characteristic quantities by itself according to an image content analysis result, so that no complex algorithm is required during implementation, and the amount of calculation of image deforming can be effectively reduced. In addition, in the embodiments of the present invention, the pair of operation control points is acquired and space mapping is performed based on the pair of operation control points, which can reduce the number of characteristic quantities involved in the calculation and further reduce the amount of calculation of image deforming, compared with a mapping manner based on multiple characteristic quantities (for example, multiple characteristic lines). The method and apparatus for processing an image that are provided in the present disclosure can effectively reduce the amount of calculation of image deforming, and increase the image processing speed, and therefore are more applicable to a user terminal that has a high requirement on real-time performance.

BRIEF DESCRIPTION OF THE DRAWINGS

To describe technical solutions in embodiments of the present invention or in the prior art more clearly, the following briefly introduces accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments with reference to the accompanying drawings in the embodiments. Apparently, the described embodiments are merely some but not all of the embodiments of the present invention. All other embodiments obtained by a person of ordinary skill in the art based on the embodiments of the present invention without creative efforts shall fall within the protection scope of the present disclosure.

Figure 1:
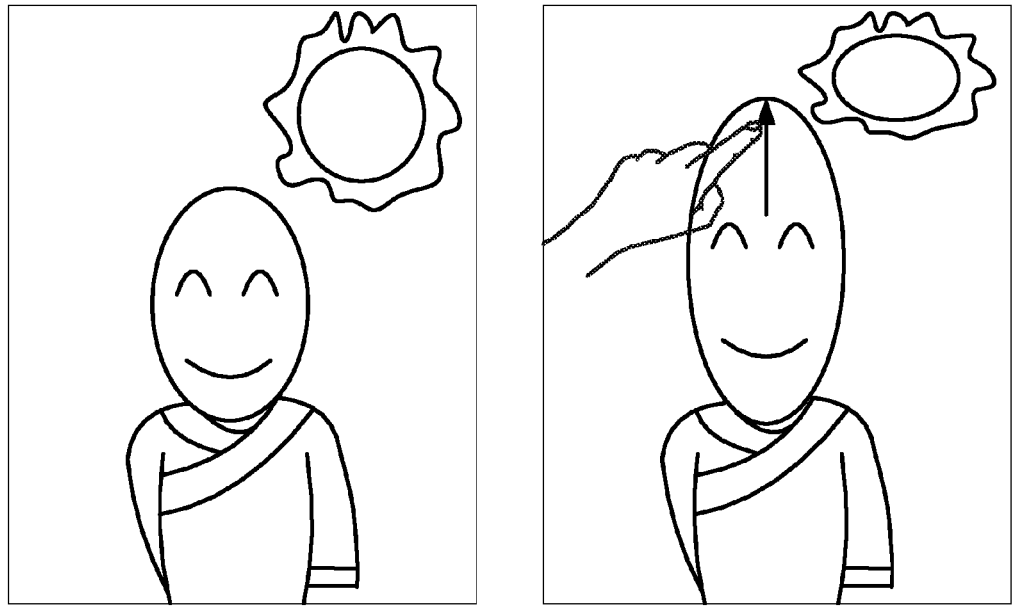
FIG. 1 is a schematic diagram of image deforming.

To better understand the embodiments of the present invention, before description of a specific solution, an image deforming technology is briefly described first from the perspective of man-machine interaction. The image deforming technology is an image processing technology for performing space mapping on a pixel in a local area of an image, so as to change the image structure of this area. Different from a common image zoom technology, the image deforming technology is not to perform simple zooming in/out processing on image content as a whole, but is to modify the image structure in the area by performing local stretching processing on the image and local contraction processing corresponding to the stretching processing. For an image shown on the left in FIG. 1, if the human face is longitudinally stretched, a deformed image is shown on the right in FIG. 1. The structural proportion of the human face in the image in a longitudinal axis direction is changed (which is a result of image deforming); while the structural proportion of the human face in a lateral axis direction in the image is not changed. Generally, in terms of use by a user, image deforming operations are divided into multiple operation manners such as stretching, contraction, and twisting; while, in terms of background processing, the essence of the image deforming operations is a stretching operation. The reason is that because stretching of an area of the image occupies some space of another area, the image in the another area must be contracted in order to balance the overall layout of the image. For example, for the image shown on the right in FIG. 1, when the head portrait is stretched upward, the sun overhead needs to be properly contracted; otherwise, the sun portion of the image overlaps an image in an area above the sun, or is "squeezed out of" the border of the image, resulting in image distortion. That is, the stretching action and the contraction action in image deforming go together, and neither of them can exist alone. In fact, in terms of use by the user, the contraction operation may be categorized as a reverse stretching operation, for example, an upward contraction operation performed on the sun portion in the image on the right in FIG. 1 is in fact an upward stretching operation performed on the upper half of the head portrait, and is still a stretching operation in nature. To avoid confusion between expressions, subsequent embodiments of the present invention are all described by using an image stretching operation as an example, and do not limit whether an operation is a stretching or contraction operation in terms of use by the user.

Figure 2:
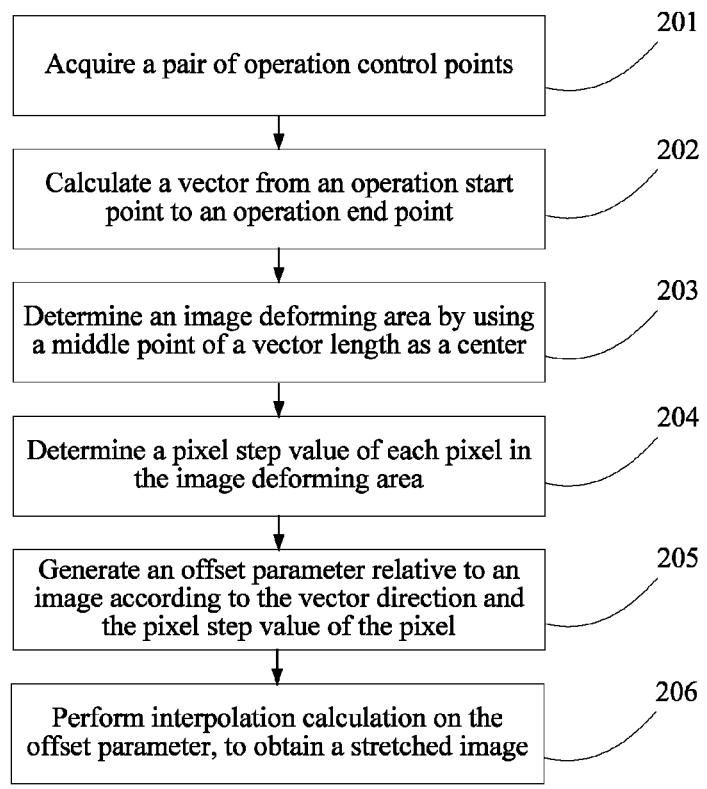
FIG. 2 is a flowchart of a method for processing an image according to an embodiment of the present invention.

To reduce the amount of calculation involved in the image deforming process, and increase the response speed of image deforming processing, an embodiment of the present invention provides a method for processing an image. As shown in FIG. 2, the method includes:

201: Acquire a pair of operation control points.

The pair of operation control points includes an operation start point and an operation end point, and is used to stretch the image. When needing to stretch the image, a user may trigger a stretching operation instruction at a corresponding position of the image. A terminal acquires a pair of operation control points according to the stretching operation instruction triggered by the user, where an operation start point and an operation end point in the pair of operation control points are separately used to locate a start position and an end position of a stretching action, and a distance between the start position and the end position represents magnitude of a stretching degree that the user intends to achieve.

For a touchscreen terminal that is currently widely used, the user may trigger the stretching operation instruction by sliding on the touchscreen. The terminal captures a sliding track of a finger of the user by using a particular monitoring thread, and then determines a start point of the sliding track as an operation start point, and determines an end point of the sliding track as an operation end point. For a non-touchscreen terminal (for example, a conventional desktop computer or a mobile phone equipped with a physical keyboard), the terminal may acquire the operation control points by using an input device included in the terminal, for example, the user may select the start/end position of the stretching operation by using a mouse or a physical navigation key, and the terminal acquires the operation start point and the operation end point by tracking a cursor in displayed content. In this embodiment, a specific manner in which the terminal acquires the operation control points is not limited.

202: Calculate a vector from an operation start point to an operation end point.

Figure 3:
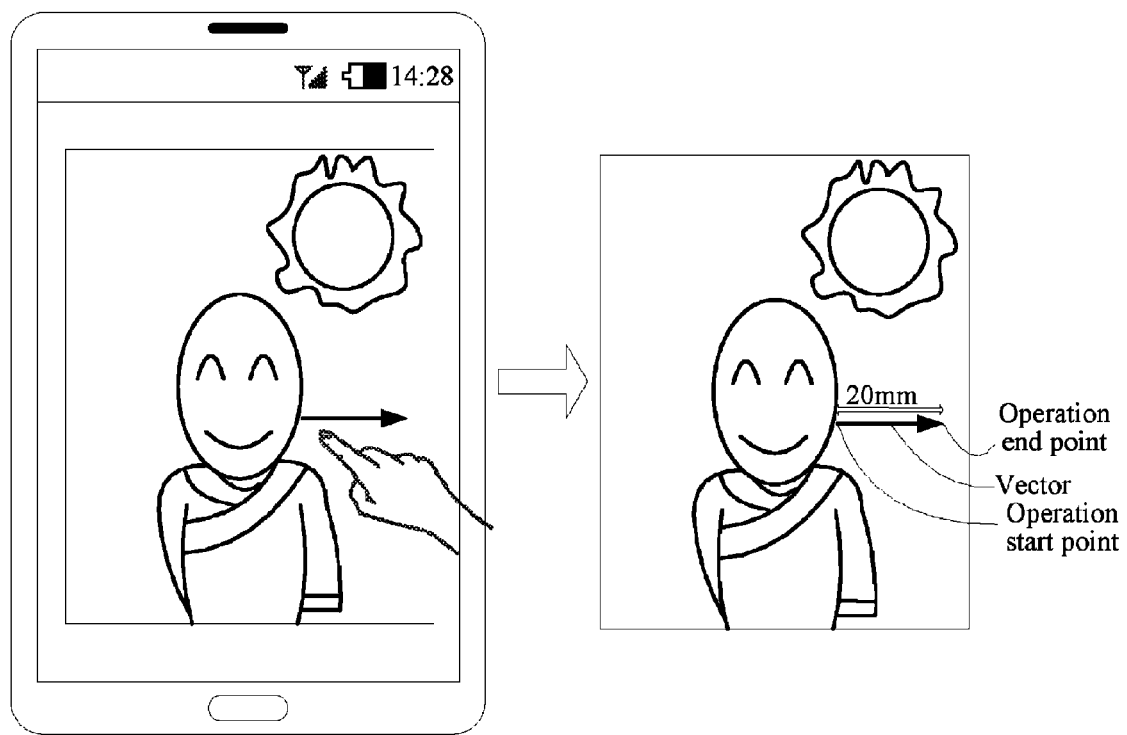
FIG. 3 is a schematic diagram of vector calculation according to an embodiment of the present invention.

After determining the operation start point and the operation end point, the terminal calculates a vector from the operation start point to the operation end point, where the vector includes two parameters, that is, a vector length and a vector direction, where the vector length is used to represent the stretching degree, and the vector direction is used to represent a stretching direction. Exemplarily, for a pair of operation control points, a vector obtained through calculation by the terminal is shown in FIG. 3, where the vector length of the vector is 20 mm, and the vector direction is horizontally rightward.

203: Determine an image deforming area by using a middle point of a vector length of the vector as a center.

After obtaining through calculation the vector length and the vector direction, the terminal needs to determine a image deforming area according to the vector length. As described above, image deforming is to perform stretching processing on content of an area in an image, rather than on the image as a whole; therefore before space mapping is performed, an area to be deformed in the image needs to be determined first. In this embodiment, the terminal determines the image deforming area according to the value of the vector length, so as to associate the size of the image deforming area with a variation degree (for example, the length of a sliding track) of a user operation, thereby implementing precise control of the user on the stretching operation.

Figure 4:
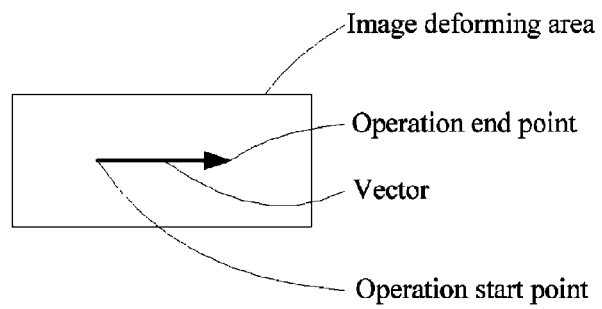
FIG. 4 is a schematic diagram of an image deforming area according to an embodiment of the present invention.

When the image deforming area is determined, it needs to ensure that the image deforming area covers the operation start point and the operation end point; in other words, it needs to ensure that the vector obtained through calculation in step 202 is located in the image deforming area; therefore the border of the image deforming area needs to be longer than the vector length. In an implementation manner of this embodiment, to meet the foregoing requirements, a design in which a shortest border is longer than the vector length may be used. In another preferred manner, to implement accurate control on the image deforming area (so as to ensure accuracy of image deforming), the image deforming area may be designed based on such a criterion that a longest border is longer than the vector length, and a length relationship between a shorter border and the vector length is not limited. Exemplarily, as shown in FIG. 4, for a rectangular image deforming area, it only needs to ensure that a long side of the rectangular image deforming area is longer than the vector length, and a short side of the rectangular image deforming area may be longer than the vector length, or may be shorter than or equal to the vector length.

Figure 5:
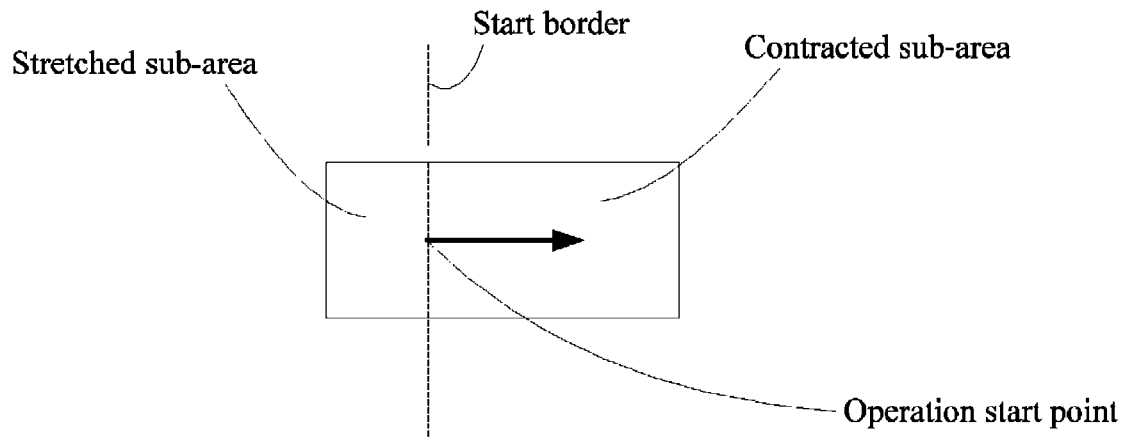
FIG. 5 is a schematic diagram of another image deforming area according to an embodiment of the present invention.

As described above, stretching of a portion of the image necessarily corresponds to contraction of another portion of the image; therefore after determining the image deforming area, the terminal also needs to further determine a contracted sub-area and a stretched sub-area in the image deforming area. To ensure operational motion sensing of the user, a precedence relationship between sub-area positions needs to be kept consistent with a direction in which the user triggers the stretching operation instruction, that is, the precedence relationship between the sub-area positions needs to be kept consistent with the vector direction. Exemplarily, in FIG. 5, an area that starts from a start border (which is indicated by a dashed line in the figure) that is a vertical line on which the operation start point is located and extends toward the vector direction to the right border of the image deforming area is a contracted sub-area, and an area that starts from the start border that is the vertical line on which the operation start point is located and extends in a direction opposite to the vector direction to the left border of the image deforming area is a stretched sub-area. When the user slides the image on the screen from left to right in the vector direction in FIG. 5, it can be ensured that the image behind the sliding action is stretched, and the image ahead of the sliding action is contracted, thereby fitting the operational motion sensing of the user.

204: Determine a pixel step value of each pixel in the image deforming area.

Figure 6:
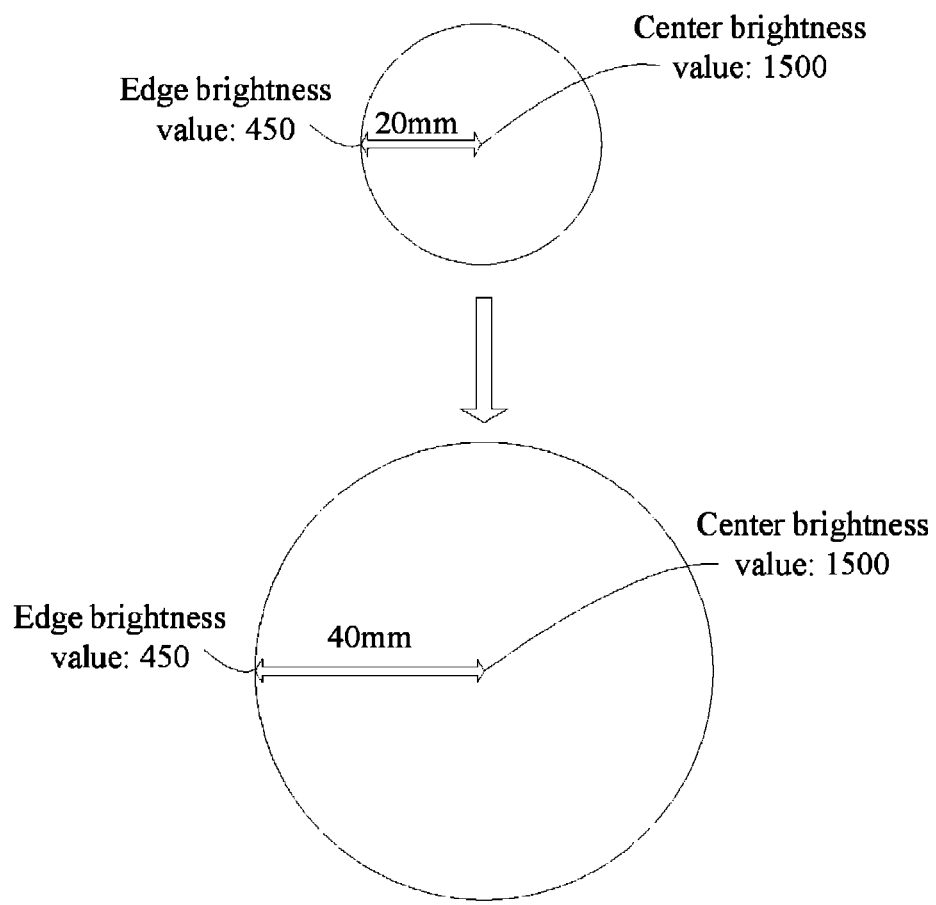
FIG. 6 is a schematic diagram illustrating the magnitude of a pixel step value according to an embodiment of the present invention.

As an important parameter for space mapping of pixels, the pixel step value is used to reflect a color variation amount between neighboring pixels. To facilitate understanding of the pixel step value, the following describes the concept of the pixel step value by using a specific example. As shown in FIG. 6, in an example in which a color parameter is replaced with a brightness value, the radius of the sun is 20 mm, where the length of the radius is displayed in an arrangement of 1000 pixels, a brightness value at the center of the sun is 1500, and a brightness value at the edge of the sun is 450. Assuming that the brightness value from the center of the sun to the edge of the sun is in linear transition, the pixel step value of each pixel along the length of the radius may be obtained through calculation: (1500−450)/1000=1.05 units of the brightness value, that is, a brightness difference between two neighboring pixels is 1.05 units of the brightness value.

Further, if the edge of the sun is stretched outward to a doubled length, that is, the radius of the sun is expanded to 40 mm, the radius of 40 mm of the sun needs to be extended to be displayed in an arrangement of 1000*2 pixels, that is, a total of 2000 pixels. The brightness values at the center of the sun and at the edge of the sun remain unchanged, that is, brightness values of various portions of the sun are not influenced by the change in the radius of the sun, and the range of the brightness value from the center of the sun to the edge of the sun is still [450, 1500]. Therefore, after stretching, the pixel step value of each pixel changes to: (1500−450)/2000=0.525 units of the brightness value. It can be seen from this that compared with the pixel step value of the pixel in the original image, the numerical value of a pixel step value of a pixel in the stretched sub-area decreases. Similarly (not shown in this example), compared with the pixel step value of the pixel in the original image, the numerical value of a pixel step value of a pixel in the contracted sub-area increases. Therefore, when determining the pixel step value of the pixel, the terminal needs to separately determine the pixel step values of the pixels in the contracted sub-area and the stretched sub-area according to the foregoing relationship.

Specifically, when determining the pixel step value, the terminal may use a preset step value threshold as a criterion (in an actual application, the pixel step value of the original image may be used as the step value threshold), so that the pixel step value of the pixel in the contracted sub-area is greater than the preset step value threshold (to achieve a contraction effect compared with the original image), and the pixel step value of the pixel in the stretched sub-area is less than the preset step value threshold (to achieve a stretching effect of compared with the original image).

It should be noted that, the process of determining the pixel step value is for each pixel, but not for the contracted/stretched sub-area as a whole; in this embodiment, the terminal does not set pixel step values of all pixels in the contracted sub-area (or the stretched sub-area) to a same numerical value, and in fact, pixel step values of pixels in a sub-area may be the same or may be different; in this embodiment, it only needs to ensure that the pixel step value of the pixel in the contracted sub-area is greater than the step value threshold and the pixel step value of the pixel in the stretched sub-area is less than the step value threshold (that is, ensure that a contraction effect is achieved for an image in the contracted sub-area compared with the original image, and a stretching effect is achieved for an image in the stretched sub-area compared with the original image); and the pixel step value of each pixel may be separately set according to an actual need, and in this embodiment, a specific numerical value of the pixel step value of each pixel is not limited.

In addition, as described above, to prevent a distortion problem such as image overlapping in the image deforming process, when determining the pixel step value, the terminal further needs to ensure that an integral value of the pixel step value in the contracted sub-area is equal to an integral value of the pixel step value of the pixel in the stretched sub-area, that is, ensure that in the image deforming area, an image contraction degree of the contracted sub-area is kept consistent with an image stretching degree of the stretched sub-area.

205: Generate an offset parameter relative to an image according to the vector direction and the pixel step value of the pixel.

After calculating the pixel step value, the terminal generates an offset parameter relative to the original image, where the offset parameter includes an offset direction and the pixel step value of each pixel in the image deforming area. The offset direction of the pixel is the vector direction of the vector calculated in step 202, and the pixel step value of the pixel is the pixel step value determined in step 204.

In this embodiment, the terminal may directly use the vector direction as the offset direction of the pixel. In addition, the terminal may further calculate a corresponding mapping offset direction for the pixel according to a relative position relationship between the pixel and the vector by using the vector direction as a reference direction, thereby further improving the accuracy of image deforming.

206: Perform interpolation calculation on the offset parameter, to obtain a stretched image.

In this step, after performing substitution calculation by using the offset parameter generated in step 205 and according to an existing image interpolation algorithm to complete space mapping of pixels, the terminal obtains a stretched image.

Optionally, the terminal may perform space mapping on the pixels by using a currently commonly used quadratic interpolation algorithm or cubic interpolation algorithm. For specific calculation processes of quadratic interpolation and cubic interpolation, reference may be made to existing technical literature in this art, and details are not described herein.

The method for processing an image that is provided in this embodiment of the present invention can determine, based on a vector obtained through calculation by using a user operation instruction, an image deforming area, determine a pixel offset direction (a vector direction) and offset amount (a pixel step value) for this area, and finally perform space mapping of the image according to an image interpolation algorithm. Compared with an implementation manner in the existing technology in which the number and distribution of characteristic quantities are determined based on an image content analysis, the amount of calculation involved in image content analysis and characteristic quantity determination can be saved. Generally, the image content analysis and the characteristic quantity determination based on an image analysis result need to be implemented by using a complex algorithm; therefore compared with the existing technology, the method provided in this embodiment of the present invention can greatly reduce the amount of calculation involved in image deforming, and improve the image processing speed.

In addition, in the method for processing an image that is provided in this embodiment of the present invention, the vector based on which the terminal performs image deforming is determined by a pair of operation control points; and compared with the existing technology, the number of characteristic quantities needed by space mapping is greatly reduced, and therefore the amount of calculation involved in image deforming can be further reduced.

Thirdly, in this embodiment of the present invention, the operation control points are determined by capturing a user operation instruction, and compared with the implementation manner in the existing technology in which the number and distribution of characteristic quantities are calculated, no complex function such as a radial basis function is involved. Therefore, compared with the existing technology, the method for processing an image that is provided in this embodiment of the present invention can save the amount of calculation caused by the use of a complex algorithm during implementation, and can further reduce the amount of calculation involved in image deforming.

Figure 7:
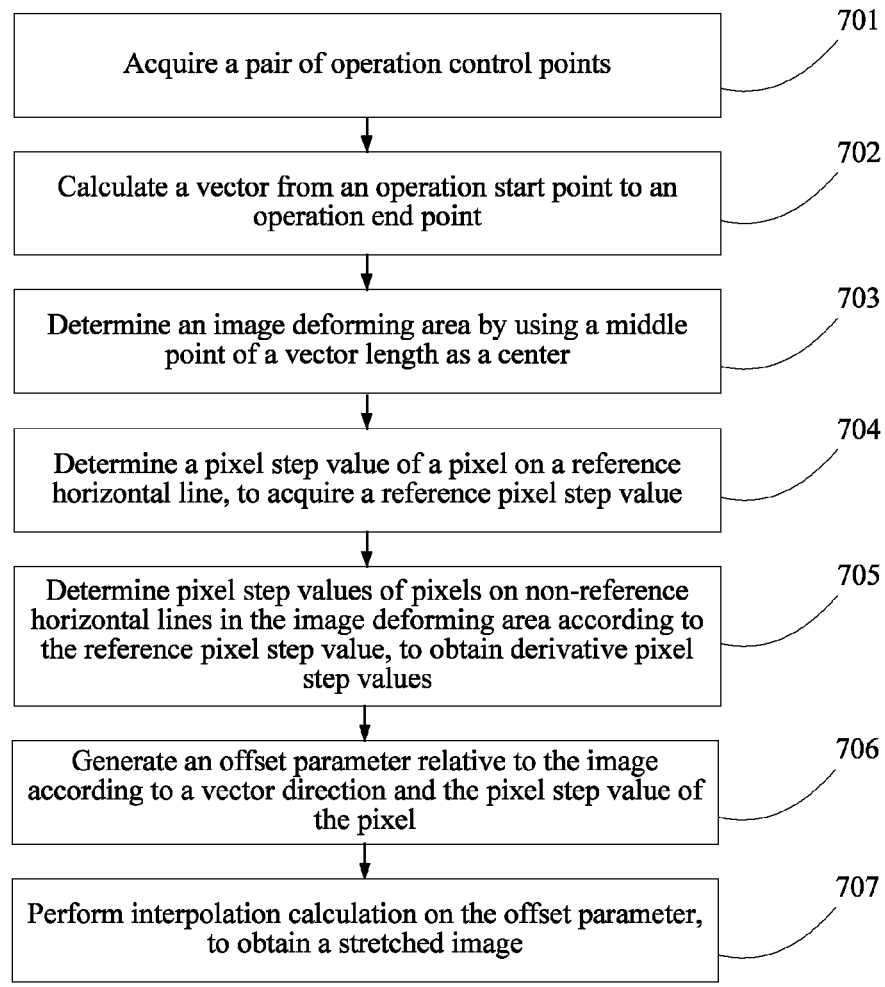
FIG. 7 is a flowchart of another method for processing an image according to an embodiment of the present invention.

To explain the method shown in FIG. 2 in further detail, an embodiment of the present invention further provides a method for processing an image. In this method, a terminal determines pixel step values on horizontal lines in an image deforming area line by line, and performs, based on an expected effect of image stretching, differentiated processing for the magnitudes of the pixel step values on the different horizontal lines, thereby ensuring accuracy of the image stretching effect, and facilitating precise control of a user on the image stretching degree. Specifically, as shown in FIG. 7, the method includes:

701: Acquire a pair of operation control points.

702: Calculate a vector from an operation start point to an operation end point.

703: Determine an image deforming area by using a middle point of a vector length of the vector as a center.

In this embodiment, implementation manners of step 701 to step 703 are correspondingly the same as the implementation manners of step 201 to step 203 in FIG. 2, and details are not described herein again.

704: Determine a pixel step value of a pixel on a reference horizontal line, to acquire a reference pixel step value.

It is well-known that, a static image is formed by combining many pixels (for a dynamic image, each frame of the dynamic image is equivalent to a static image), and in this step, the terminal needs to determine pixel step values for all pixels in the image deforming area. For convenience of dividing the pixels in the image deforming area, in this embodiment, the two-dimensional image deforming area is split into multiple one-dimensional horizontal lines, where each horizontal line consists of one line of pixels. When determining the pixel step values, the terminal separately determines, for each horizontal line, pixel step values of all pixels on each horizontal line. For example, a horizontal line consists of one line of 200 pixels, and the terminal needs to separately determine pixel step values of the 200 pixels, that is, a total of 200 pixel step values. For brevity of description, subsequently in this embodiment, the meaning of "calculating the pixel step values of all pixels on the horizontal line" is expressed by using the expression "calculating the pixel step values of the pixels on the horizontal line".

Figure 8:
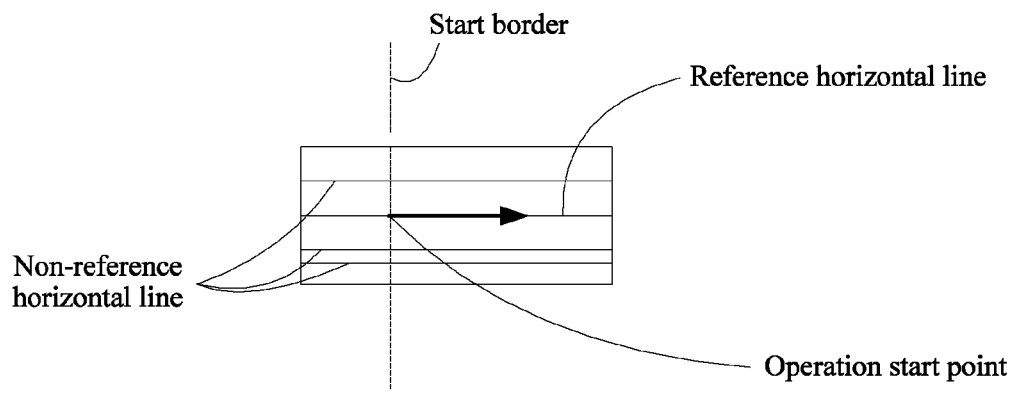
FIG. 8 is a schematic diagram of a reference/non-reference horizontal line according to an embodiment of the present invention.

When determining the pixel step values on the horizontal lines line by line, the terminal first determines the pixel step value of the pixel on the reference horizontal line. The so-called reference horizontal line refers to a horizontal line on which a vector is located. Exemplarily, as shown in FIG. 8, a connection line of middle points of the image deforming area in a horizontal direction is the reference horizontal line. As described above, the size of the image deforming area is determined by using the middle point of the vector length of the vector as the center, and therefore the vector must be located on the connection line of the middle points in the horizontal direction. In the image deforming area, all other horizontal lines except the reference horizontal line are called non-reference horizontal lines. In FIG. 8, three non-reference horizontal lines are provided exemplarily. In fact, the number of non-reference horizontal lines should meet that the non-reference horizontal lines cover area in the image deforming area except the reference horizontal line. FIG. 8 does not show all non-reference horizontal lines.

Figure 9:
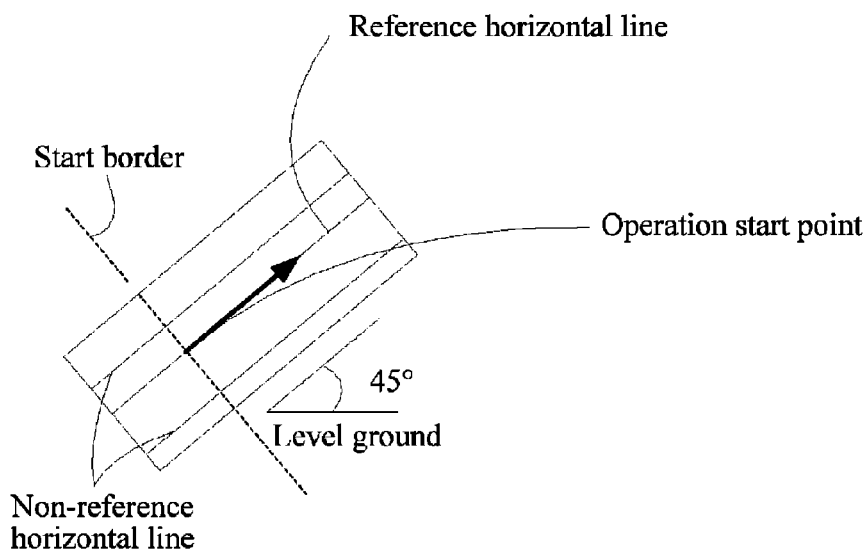
FIG. 9 is a schematic diagram of another reference/non-reference horizontal line according to an embodiment of the present invention.

It should be noted that, in this embodiment, a concept of a horizontal line is determined relative to a vector direction, and a reference/non-reference horizontal line is not strictly parallel to the level ground. In this embodiment, description is provided by using an example in which the user horizontally and rightward triggers a stretching operation instruction. Therefore, the reference/non-reference horizontal line that is kept consistent with the vector direction is parallel to the level ground; and when the vector direction is pointing to the upper right corner at an angle of 45°, which is shown in FIG. 9, the direction of the horizontal lines should be kept consistent with the vector direction, that is, form an angle of 45° with the level ground. This embodiment is subsequently described by using the vector direction shown in FIG. 8 as an example.

Figure 10:
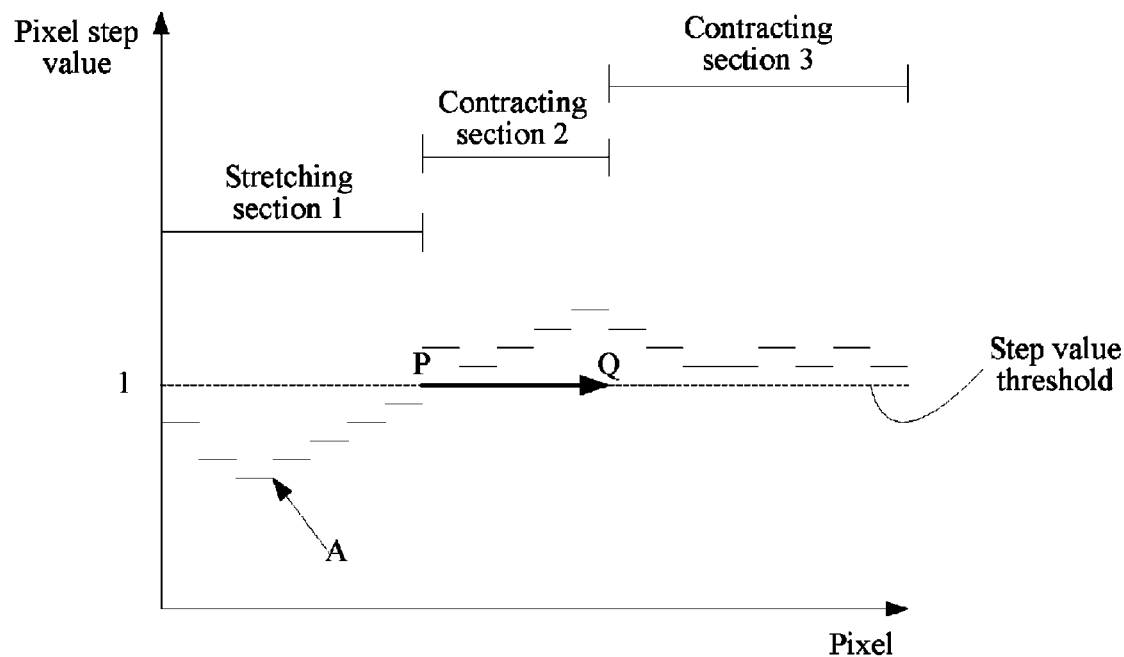
FIG. 10 is a schematic diagram of a pixel step value curve according to an embodiment of the present invention.

When determining pixel step values of pixels on the reference horizontal line, the terminal may fit and form a pixel step value curve by using any linear or non-linear function, and does not require whether the function is a monotonic function. Amplitudes of points on the pixel step value curve correspond to the pixel step value of each pixel, and these pixels are all pixels that form the reference horizontal line, and include pixels that fall within the contracted sub-area and pixels that fall within the stretched sub-area. Exemplarily, the pixel step value curve is shown in FIG. 10. A coordinate lateral axis indicates pixels arranged in turn on the reference horizontal line, the entire coordinate lateral axis may be considered as the reference horizontal line, and a direction to which the lateral axis points is the vector direction; a coordinate longitudinal axis is amplitudes of the pixel step values, where an amplitude shown by the dashed line is a step value threshold, and the threshold in this example is set to 1 (that is, corresponding to pixel step values of a normal image); and a solid line surrounding the threshold dashed line is the pixel step value curve fitted by a linear function. The curve is divided into three sections in the lateral axis direction: 1. a stretching section 1 from the origin of coordinates to a P point, where the origin of coordinates corresponds to a left border of the image deforming area, and the P point is the operation start point in the operation control points; 2. a contracting section 2 from the P point to a Q point, where the Q point is the operation end point in the operation control points; 3. a contracting section 3 from the Q point to an upper limit of the lateral axis, where the upper limit of the lateral axis corresponds to a right border of the image deforming area. In the foregoing three sections, the stretching section 1 corresponds to a portion of the reference horizontal line that is located within the stretched sub-area, and a combination of the contracting section 2 and the contracting section 3 corresponds to a portion of the reference horizontal line that is located within the contracted sub-area. Corresponding to the stretched sub-area, the pixel step value curve is located below the threshold dashed line, indicating that the pixel step values within the stretched sub-area are less than the step value threshold; and corresponding to the contracted sub-area, the pixel step value curve is located above the threshold dashed line, indicating that the pixel step values within the contracted sub-area are greater than the step value threshold. Each point on the pixel step value curve corresponds to a pixel step value of one pixel on the coordinate lateral axis, and the terminal may determine the pixel step values of the pixels on the reference horizontal line by using the pixel step value curve.

Figure 11:
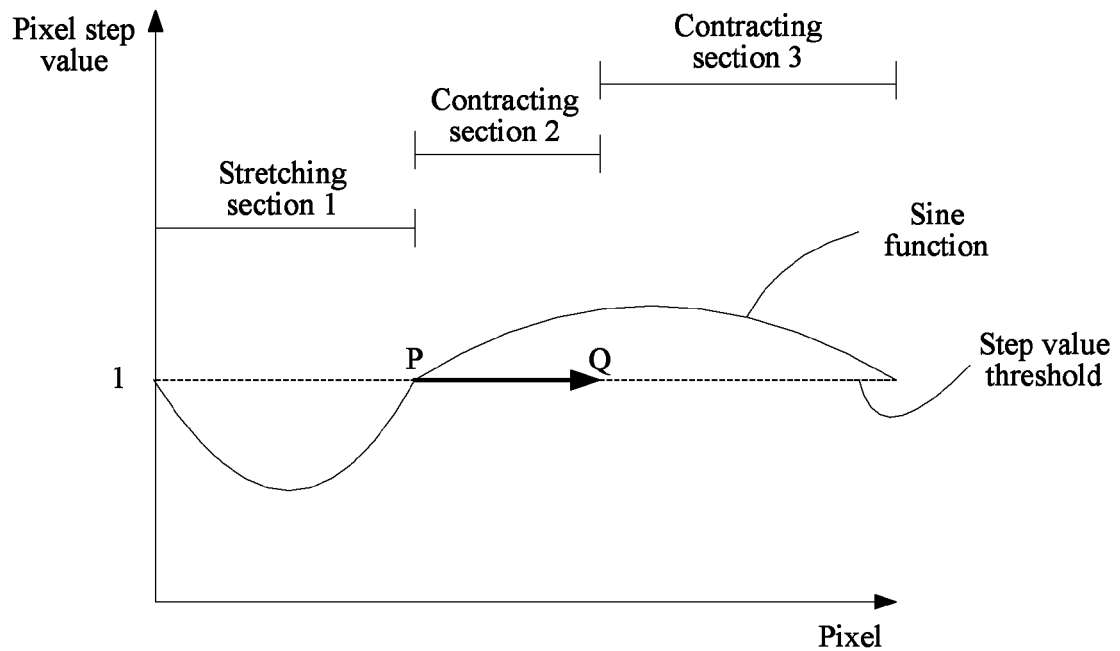
FIG. 11 is a schematic diagram of another pixel step value curve according to an embodiment of the present invention.

Further, in a preferred solution of this embodiment, to ensure smooth transition of pixels in a horizontal direction, and prevent a saw-tooth edge from appearing in a deformed image, the terminal may fit the pixel step value curve by using a continuous function, thereby obtaining the pixel step values of the pixels on the reference horizontal line. In FIG. 10, multiple turning points (such as a point A in FIG. 10) exist on the pixel step value curve, neighboring pixel step values to the left and right of a turning point are not consecutive in numerical values, and after the space mapping, jumping between corresponding pixels is strong, and the saw-tooth edge appears. In this preferred solution, the terminal may fit the pixel step value curve by using the continuous function such as a sine function, a cosine function, or a Gaussian function, thereby ensuring the smooth transition of the pixels, and improving quality of the deformed image. Exemplarily, the pixel step value curve fitted by using the sine function is shown in FIG. 11.

Figure 12:
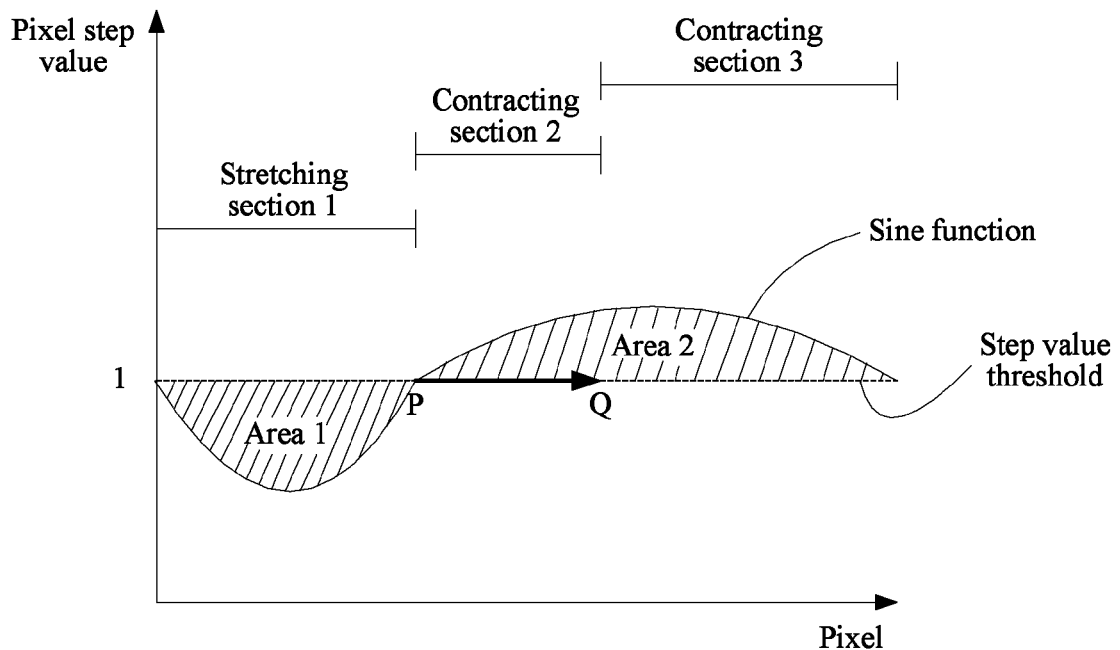
FIG. 12 is a schematic diagram of a relationship between an integral value of a pixel step value and a vector length according to an embodiment of the present invention.

Further, to ensure that the image stretching degree adapts to operational motion sensing of the user, in another preferred solution of this embodiment, besides ensuring that an integral value of the pixel step value in the contracted sub-area is equal to an integral value of the pixel step value of the pixel in the stretched sub-area, the terminal further needs to make the integral values of the two respectively equal to the vector length obtained through calculation in step 702. As shown in FIG. 12, a shaded area 1 below the threshold dashed line corresponds to pixel step values of all pixels of the reference horizontal line that fall within the stretched sub-area, where area of the area 1 is equal to the integral value of the pixel step value of the pixel in the stretched sub-area; and similarly, a shaded area 2 above the threshold dashed line corresponds to pixel step values of all pixels of the reference horizontal line that fall within the contracted sub-area, where area of the area 2 is equal to the integral value of the pixel step value of the pixel in the contracted sub-area. The terminal needs to make the two areas equal in area, and the area values of the two areas equal to the vector length. Thereby it is ensured that the image stretching degree is kept consistent with the operational motion sensing of the user.

In this embodiment, the so-called being kept consistent with the operational motion sensing of the user refers to enabling the user to sense a stretching effect that adapts to an operational motion of the user. A longer distance for which the user slides on the screen indicates a greater image stretching degree, and a fixed proportional relationship is kept between the two. When the integral value of the pixel step value is equal to the vector length, the proportional relationship is 1:1, and the image stretching degree adapts to the sliding distance of the user. In addition, in an actual application, the terminal may further set the integral value of the pixel step value to be greater than or equal to the vector length, thereby making a user operation more sensitive or tardier, or the terminal may adjust "sensitivity" of the user operation according to the value of a difference between the integral value and the vector length.

705: Determine pixel step values of pixels on non-reference horizontal lines in the image deforming area according to the reference pixel step value, to obtain derivative pixel step values.

After determining the pixel step value of the pixel on the reference horizontal line, the terminal further determines the pixel step values of the pixels on other horizontal lines (that is, the non-reference horizontal lines) in the image deforming area. For the non-reference horizontal lines, similar to the determining of the pixel step value of the reference horizontal line, the terminal may separately fit one pixel step value curve for each non-reference horizontal line, and determine the pixel step values on the non-reference horizontal lines according to the pixel step value curves. When fitting the pixel step value curve for a non-reference horizontal line, the terminal needs to ensure that a derivative pixel step value on the non-reference horizontal line is less than or equal to the reference pixel step value on the reference horizontal line. Specially, for a case in which a derivative pixel step value is equal to the reference pixel step value, the terminal may directly fit the non-reference horizontal lines by using the pixel step value curve of the reference horizontal line.

Figure 13:
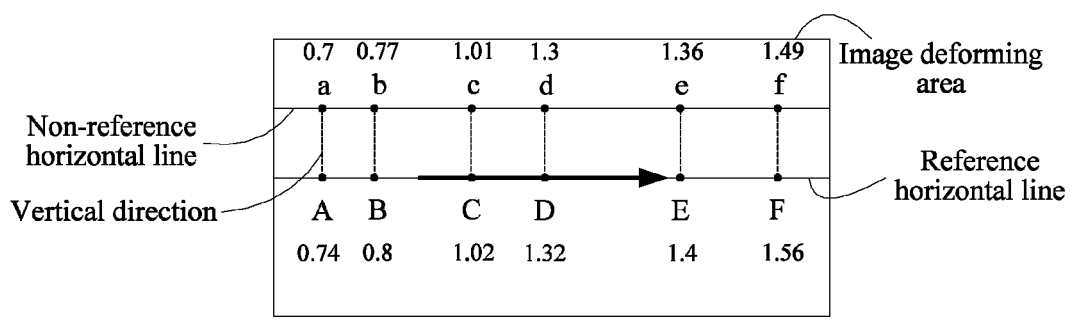
FIG. 13 is a schematic diagram of a relationship between reference pixel step values and derivative pixel step values according to an embodiment of the present invention.

It should be noted that, in this embodiment, the expression that a derivative pixel step value is less than or equal to the reference pixel step value does not refer to that pixel step values of all pixels on the non-reference horizontal line are absolutely less than a minimum pixel step value on the reference horizontal line. In fact, comparison between a derivative pixel step value and a reference pixel step value refers to comparison between pixel step values of two corresponding pixels on the reference horizontal line and a non-reference horizontal line on a same vertical direction. For example, in FIG. 13, 6 pixels A to F are in hash distribution on the reference horizontal line, and reference pixel step values of the pixels are respectively: 0.74, 0.8, 1.02, 1.32, 1.4, and 1.56; and similarly 6 pixels a to f are in hash distribution on a non-reference horizontal line, and the derivative pixel step values of the pixels are respectively: 0.7, 0.77, 1.01, 1.3, 1.36, and 1.49. The so-called comparison between the pixel step values on the vertical direction refers to comparison between the pixels A and a, comparison between the pixels B and b, and so on. It can be seen from FIG. 13 that, the pixel step values on the non-reference horizontal line are all less than the pixel step values on the corresponding reference horizontal line, but are not all less than a minimum pixel step value (0.74) on the reference horizontal line.

Further, in another preferred solution of this embodiment, to make a deforming effect more fit actual feeling of the user, the terminal may further set a derivative pixel step value on a non-reference horizontal line to be less than a reference pixel step value on the reference horizontal line. In terms of user experience, generally a position of finger sliding is an image portion that the user mainly intends to perform stretching processing, and therefore a stretching degree of this portion of image should be the highest. However, stretching processing on an image portion around the finger sliding is performed for ensuring a stretching effect to be smooth and continuous, and a stretching degree of this portion of image is relatively lower; and an image portion farther from the finger sliding position indicates a lower stretching degree, until a stretching degree is 0 for a border portion, which naturally integrates with an image area that is not stretched. To ensure that a derivative pixel step value on a non-reference horizontal line is less than a reference pixel step value on the reference horizontal line, the terminal may set deforming degrees of various areas in the image deforming area to gradually decrease progressively with the reference horizontal line as a center, thereby achieving an effect that a deforming degree on the reference horizontal line (that is, a user triggering position) is the highest and a portion farther from the reference horizontal line indicates a lower deforming degree.

Figure 14:
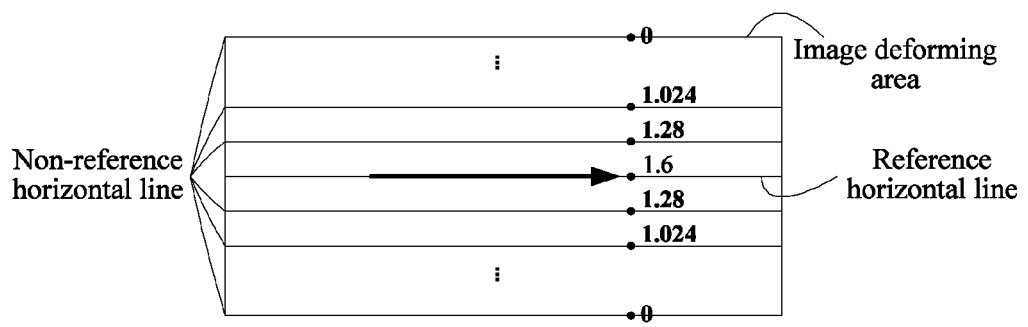
FIG. 14 is a schematic diagram of another relationship between a reference pixel step value and a derivative pixel step value according to an embodiment of the present invention.

Optionally, in this preferred solution, to further reduce the amount of calculation that is required for fitting pixel step value curves for the non-reference horizontal lines, the terminal may further derive the pixel step value curves of other non-reference horizontal lines based on the pixel step value curve of the reference horizontal line. Specifically, starting from a non-reference horizontal line neighboring to the reference horizontal line, the terminal determines the derivative pixel step values of the non-reference horizontal lines in turn according to a relationship of a decreasing function, where in the vertical direction, a non-reference horizontal line farther from the reference horizontal line indicates a smaller derivative pixel step value of the non-reference horizontal line, and a derivative pixel step value of a non-reference horizontal line that coincides with an upper border/a lower border of the image deforming area is 0. As shown in FIG. 14, a pixel is used as an example. A reference pixel step value of a pixel on the reference horizontal line is 1.6, and the terminal determines derivative pixel step values of corresponding pixels on the non-reference horizontal lines according to a linear decreasing function of Y=0.8X. Derivative pixel step values of corresponding pixels on two non-reference horizontal lines neighboring to the reference horizontal line which are above and below the reference horizontal line are respectively 1.6*0.8=1.28, derivative pixel step values of corresponding pixels on a second non-reference horizontal line are respectively 1.28*0.8=1.024, and so on, until the derivative pixel step value of the non-reference horizontal line that coincides with the upper border/the lower border of the image deforming area is 0.

In this embodiment, the decreasing function relationship is described by using a linear function as an example. In an actual application, a non-linear function may be used as the decreasing function, and this embodiment does not limit a specific form of the decreasing function.

Further, to ensure smooth transition of pixels on the vertical direction, and prevent a saw-tooth edge from appearing on the deformed image, the terminal may further use a decreasing function portion of the continuous function as the decreasing function, thereby improving the quality of the deformed image. Similar to step 704, the terminal may use a decreasing portion of the continuous function such as the sine function, the cosine function, or the Gaussian function as the decreasing function, and the details are not described in this embodiment again.

706: Generate an offset parameter relative to the image according to a vector direction of the vector and the pixel step value of the pixel.

707: Perform interpolation calculation on the offset parameter, to obtain a stretched image.

In this embodiment, implementation manners of step 706 and step 707 are correspondingly the same as the implementation manners of step 205 and step 206 in FIG. 2, and details are not described herein again.

Further, to explain the method shown in FIG. 2 in further detail, an embodiment of the present invention further provides a method for processing an image. For the implementation of step 203 in FIG. 2, the method provides several implementation manners of determining the image deforming area according to the vector length. Specifically, the terminal determines the image deforming area by using a middle point of the vector length of the vector as a center and a multiple of the vector length of the vector as the length and width or the radius, where the multiple is a natural number greater than 1.

Figure 15:
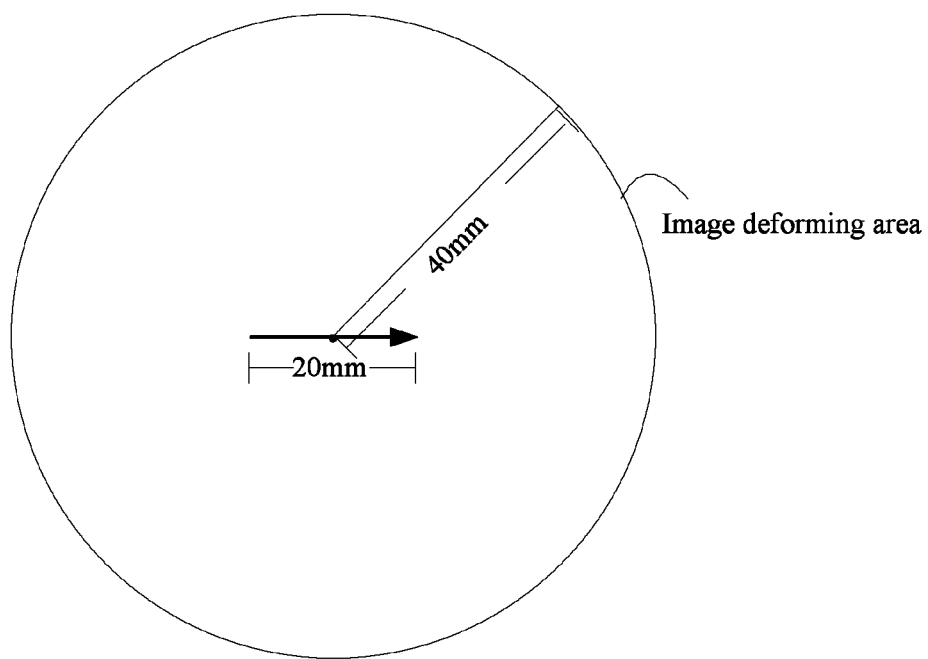
FIG. 15 is a schematic diagram of a circular image deforming area according to an embodiment of the present invention.

In this embodiment, the image deforming area determined by the terminal may be in various shapes such as square, rectangular, circular, or wedge-shaped. Using a circular deforming area as an example, as shown in FIG. 15, the vector length is 20 mm, the radius of the circle is 2 times the vector length, that is, the radius of the circle is 40 mm, and the circular area covers the operation start point and the operation end point of the vector.

Figure 16:
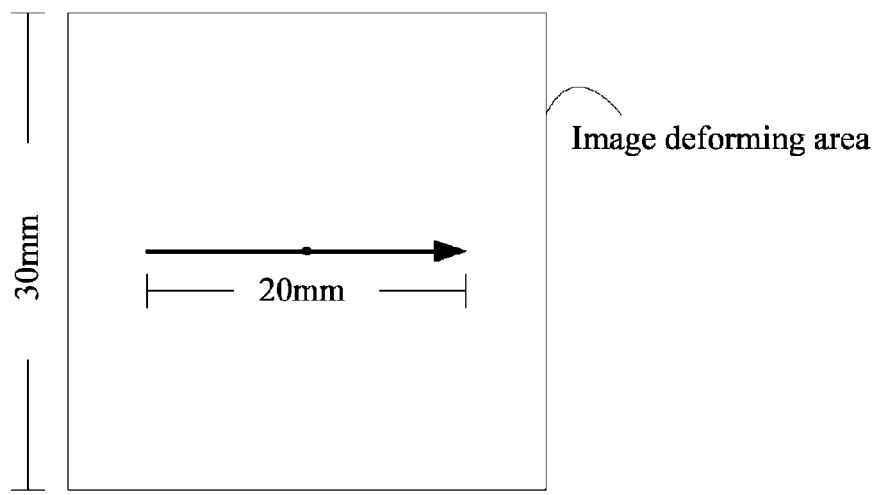
FIG. 16 is a schematic diagram of a square image deforming area according to an embodiment of the present invention.

In another implementation manner of this embodiment, as shown in FIG. 16, the image deforming area determined by the terminal is a square area, where the vector length is 20 mm, the side length of the square is 1.5 times the vector length, that is, the side length of the square is 30 mm, and the square area also covers the operation start point and the operation end point of the vector.

Figure 17:
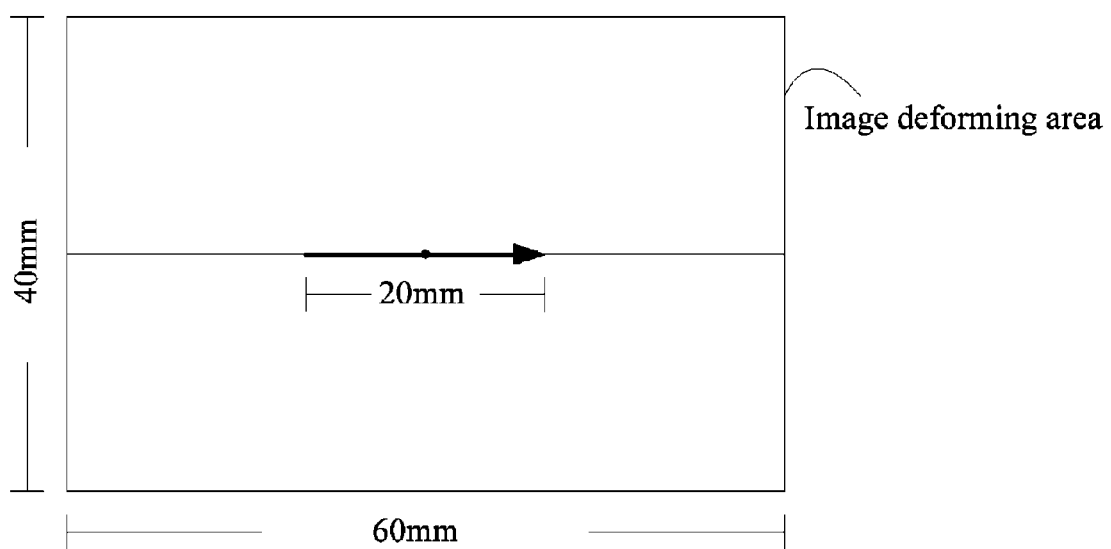
FIG. 17 is a schematic diagram of a rectangular image deforming area according to an embodiment of the present invention.

Further, in a preferred solution of this embodiment, as shown in FIG. 17, the image deforming area determined by the terminal is a rectangular area, where the vector length is 20 mm, the length of a long side of the rectangle is 3 times the vector length (that is, is 60 mm), the length of a short side is 2 times the vector length (that is, is 40 mm), and the operation start point and the operation end point of the vector are respectively located at one-third points of the central line between the short sides.

In this embodiment, the purpose of limiting the length and the width of the image deforming area to be longer than the vector length is to ensure that the image deforming area can cover the operation start point and the operation end point, only by which can a contracted sub-area and a stretched sub-area be delimited within the image deforming area. However, for a circular image deforming area, the radius of the circular image deforming area is not restrained by the foregoing condition. In fact, the foregoing condition can be met as long as the radius of the circular area is longer than a half of the vector length.

Figure 18:
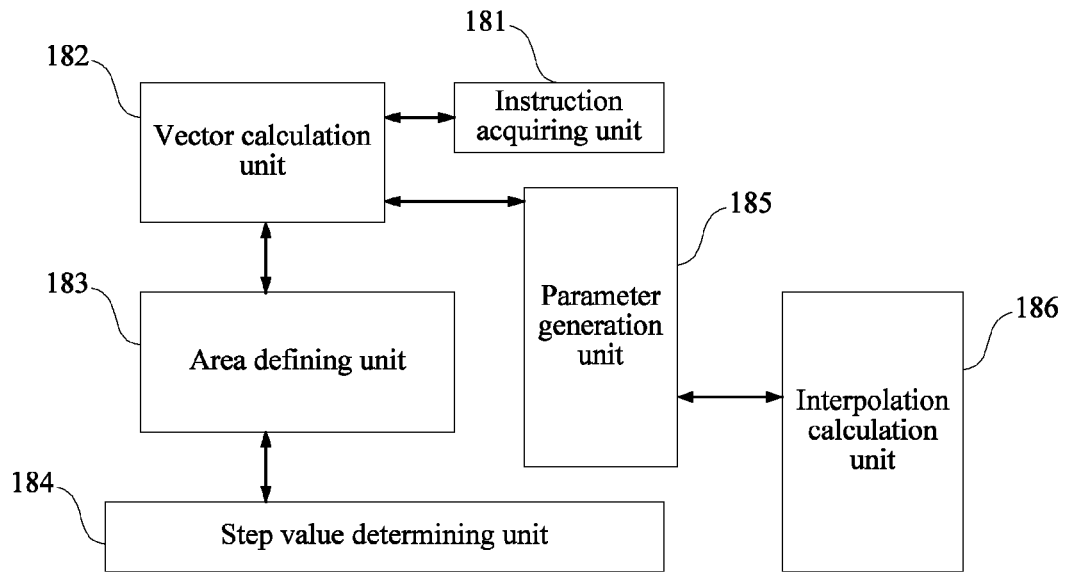
FIG. 18 is a schematic structural diagram of an apparatus for processing an image according to an embodiment of the present invention.

Further, as an implementation of the methods that are shown in the foregoing figures, an embodiment further provides an apparatus for processing an image, where the apparatus is located inside a terminal such as a mobile phone or a computer, and is configured to implement the methods that are shown in the foregoing figures. As shown in FIG. 18, the apparatus includes: an instruction acquiring unit 181, a vector calculation unit 182, an area defining unit 183, a step value determining unit 184, a parameter generation unit 185, and an interpolation calculation unit 186, where, the instruction acquiring unit 181 is configured to acquire a pair of operation control points, the pair of operation control points including an operation start point and an operation end point, and being used to stretch the image;

the vector calculation unit 182 is configured to calculate a vector from the operation start point to the operation end point for the pair of operation control points that are acquired by the instruction acquiring unit 181;

the area defining unit 183 is configured to determine an image deforming area by using a middle point of a vector length of the vector calculated by the vector calculation unit 182 as a center, the image deforming area covering the operation start point and the operation end point, an area that starts from a start border that is a vertical line on which the operation start point is located and extends toward a vector direction of the vector to a border of the image deforming area being a contracted sub-area, and an area that starts from the start border that is the vertical line on which the operation start point is located and extends in a direction opposite to the vector direction to another border of the image deforming area being a stretched sub-area;

the step value determining unit 184 is configured to determine a pixel step value of each pixel in the image deforming area determined by the area defining unit 183, a pixel step value of a pixel in the contracted sub-area being greater than a preset step value threshold, a pixel step value of a pixel in the stretched sub-area being less than the step value threshold, and an integral value of the pixel step value in the contracted sub-area being equal to an integral value of the pixel step value of the pixel in the stretched sub-area;

the parameter generation unit 185 is configured to generate an offset parameter relative to the image according to the vector direction of the vector calculated by the vector calculation unit 182 and the pixel step value of the pixel that is determined by the step value determining unit 184; and the interpolation calculation unit 186 is configured to perform interpolation calculation on the offset parameter generated by the parameter generation unit 185, to obtain a stretched image.

Figure 19:
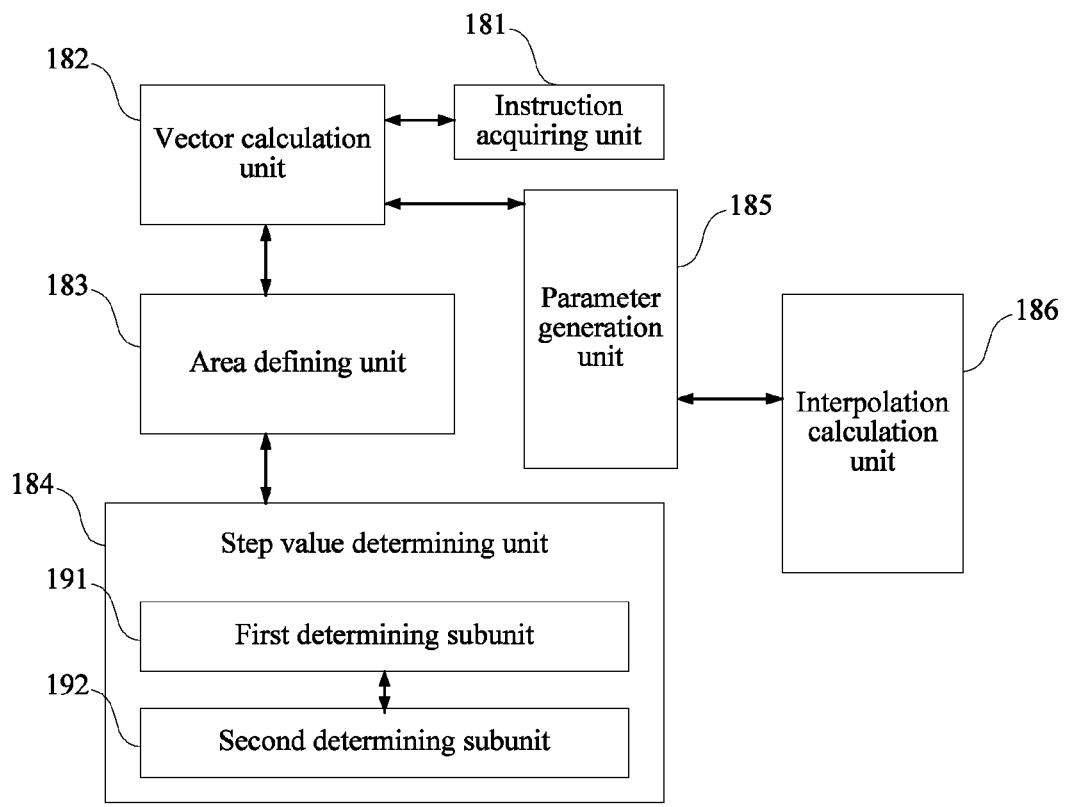
FIG. 19 is a schematic structural diagram of another apparatus for processing an image according to an embodiment of the present invention.

Further, as shown in FIG. 19, the step value determining unit 184 includes:

a first determining subunit 191, configured to determine a pixel step value of a pixel on a reference horizontal line, to obtain a reference pixel step value, where the reference horizontal line is a horizontal line on which the vector is located; and a second determining subunit 192, configured to determine pixel step values of pixels on non-reference horizontal lines in the image deforming area according to the reference pixel step value determined by the first determining subunit 191, to obtain derivative pixel step values, where a derivative pixel step value in a vertical direction is less than or equal to the reference pixel step value.

Further, on the reference horizontal line, the integral value of the pixel step value in the contracted sub-area that is determined by the first determining subunit 191 is equal to the integral value of the pixel step value of the pixel in the stretched sub-area, and is equal to the vector length of the vector calculated by the vector calculation unit 182.

Further, the first determining subunit 191 is configured to fit a pixel step value curve by using a continuous function curve, to obtain the pixel step value of the pixel on the reference horizontal line.

Further, in the vertical direction, the derivative pixel step value determined by the second determining subunit 192 is less than the reference pixel step value determined by the first determining subunit 191, and the second determining subunit 192 is configured to: starting from a non-reference horizontal line neighboring to the reference horizontal line, determine the derivative pixel step values of the non-reference horizontal lines in turn according to a relationship of a decreasing function, where in the vertical direction, a non-reference horizontal line farther from the reference horizontal line indicates a smaller derivative pixel step value of the non-reference horizontal line, and a derivative pixel step value of a non-reference horizontal line that coincides with an upper border/a lower border of the image deforming area is 0.

Further, the second determining subunit 192 is configured to use a decreasing function portion of a continuous function as the decreasing function.

Further, the area defining unit 183 is configured to determine the image deforming area by using the middle point of the vector length of the vector as the center and a multiple of the vector length of the vector as the length and width or the radius, where the multiple is greater than 1.

Further, the parameter generation unit 185 is configured to determine the vector direction of the vector as an offset direction of the pixel, where the offset parameter includes the offset direction and the pixel step value of the pixel.

Further, the interpolation calculation unit 186 is configured to perform quadratic interpolation calculation or cubic interpolation calculation on the offset parameter.

By means of the apparatus for processing an image that is provided in the present disclosure, a pair of operation control points on a to-be-deformed image is acquired according to an operation instruction of a user, where the pair of operation control points includes an operation start point and an operation end point; then, a vector from the operation start point to the operation end point is calculated; and an image deforming area that covers the operation start point and the operation end point is determined in the to-be-deformed image by using a middle point of a vector length of the vector as a center, where the image deforming area is divided into a contracted sub-area and a stretched sub-area. A pixel step value of each pixel in the image deforming area is determined, where a pixel step value of a pixel in the contracted sub-area is greater than a preset step value threshold, and a pixel step value of a pixel in the stretched sub-area is less than the step value threshold; then, an offset parameter relative to the image is generated next according to a vector direction of the vector and the pixel step value of the pixel, and interpolation calculation is performed on the offset parameter, to obtain a stretched image. Compared with the existing technology, in the present disclosure, the acquired operation control points are obtained through triggering by the user, and a terminal does not need to analyze specific content of the image, and does not need to determine the number and distribution of characteristic quantities by itself according to an image content analysis result, so that no complex algorithm is required during implementation, and the amount of calculation of image deforming can be effectively reduced. In addition, in the embodiments of the present invention, the pair of operation control points is acquired and space mapping is performed based on the pair of operation control points, which can reduce the number of characteristic quantities involved in the calculation and further reduce the amount of calculation of image deforming, compared with a mapping manner based on multiple characteristic quantities (for example, multiple characteristic lines). The apparatus for processing an image that is provided in the present disclosure can effectively reduce the amount of calculation of image deforming, and increase the image processing speed, and therefore is more applicable to a user terminal that has a high requirement on real-time performance.

In addition, in the apparatus for processing an image that is provided in this embodiment of the present invention, the vector based on which image deforming is performed is determined by a pair of operation control points; and compared with the existing technology, the number of characteristic quantities needed by space mapping is greatly reduced, and therefore the amount of calculation involved in image deforming may be further reduced.

Thirdly, in this embodiment of the present invention, the operation control points are determined by capturing a user operation instruction, and compared with the implementation manner in the existing technology in which the number and distribution of characteristic quantities are calculated, no complex function such as a radial basis function is involved. Therefore, compared with the existing technology, the apparatus for processing an image that is provided in this embodiment of the present invention can save the amount of calculation caused by the use of a complex algorithm during implementation, and can further reduce the amount of calculation involved in image deforming.

Based on the foregoing descriptions of the implementation manners, a person skilled in the art may clearly understand that the present disclosure may be implemented by software plus necessary universal hardware or by hardware only. In most circumstances, the former is a preferred implementation manner. Based on such an understanding, the technical solutions of the present disclosure essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of the present invention.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for processing an image, comprising:
   acquiring a pair of operation control points, the pair of operation control points comprising an operation start point and an operation end point, and being used to stretch the image;
   calculating a vector from the operation start point to the operation end point;
   determining an image deforming area by using a middle point of a vector length of the vector as a center, the image deforming area covering the operation start point and the operation end point, an area that starts from a start border that is a vertical line on which the operation start point is located and extends toward a vector direction of the vector to a border of the image deforming area being a contracted sub-area, and an area that starts from the start border that is the vertical line on which the operation start point is located and extends in a direction opposite to the vector direction of the vector to another border of the image deforming area being a stretched sub-area;
   determining a pixel step value of each pixel in the image deforming area, a pixel step value of a pixel in the contracted sub-area being greater than a preset step value threshold, a pixel step value of a pixel in the stretched sub-area being less than the step value threshold, and an integral value of the pixel step value in the contracted sub-area being equal to an integral value of the pixel step value of the pixel in the stretched sub-area;
   generating an offset parameter relative to the image according to the vector direction of the vector and the pixel step value of the pixel; and
   performing interpolation calculation on the offset parameter, to obtain a stretched image.

2. The method according to claim 1, wherein the determining a pixel step value of each pixel in the image deforming area comprises:
   determining a pixel step value of a pixel on a reference horizontal line, to obtain a reference pixel step value, wherein the reference horizontal line is a horizontal line on which the vector is located; and
   determining pixel step values of pixels on non-reference horizontal lines in the image deforming area according to the reference pixel step value, to obtain derivative pixel step values, wherein a derivative pixel step value in a vertical direction is less than or equal to the reference pixel step value.

3. The method according to claim 2, wherein on the reference horizontal line, the integral value of the pixel step value in the contracted sub-area is equal to the integral value of the pixel step value of the pixel in the stretched sub-area, and is equal to the vector length.

4. The method according to claim 3, wherein the determining a pixel step value of a pixel on a reference horizontal line comprises:
   fitting a pixel step value curve by using a continuous function curve, to obtain the pixel step value of the pixel on the reference horizontal line.

5. The method according to claim 2, wherein the derivative pixel step value in the vertical direction is less than the reference pixel step value, and the determining pixel step values of pixels on non-reference horizontal lines in the image deforming area according to the reference pixel step value comprises:
   starting from a non-reference horizontal line neighboring to the reference horizontal line, determining the derivative pixel step values of the non-reference horizontal lines in turn according to a relationship of a decreasing function, wherein in the vertical direction, a non-reference horizontal line farther from the reference horizontal line indicates a smaller derivative pixel step value of the non-reference horizontal line, and a derivative pixel step value of a non-reference horizontal line that coincides with an upper border/a lower border of the image deforming area is 0.

6. The method according to claim 5, wherein a decreasing function portion of a continuous function is used as the decreasing function.

7. The method according to claim 1, wherein the determining an image deforming area by using a middle point of a vector length of the vector as a center comprises:
determining the image deforming area by using the middle point of the vector length of the vector as the center and a multiple of the vector length of the vector as the length and width or the radius, wherein the multiple is greater than 1.

8. The method according to claim 1, wherein the generating an offset parameter relative to the image according to the vector direction of the vector and the pixel step value of the pixel comprises:
determining the vector direction of the vector as an offset direction of the pixel, wherein the offset parameter comprises the offset direction and the pixel step value of the pixel.

9. An apparatus for processing an image, comprising:
an instruction acquiring unit, configured to acquire a pair of operation control points, the pair of operation control points comprising an operation start point and an operation end point, and being used to stretch the image;
a vector calculation unit, configured to calculate a vector from the operation start point to the operation end point for the pair of operation control points that are acquired by the instruction acquiring unit;
an area defining unit, configured to determine an image deforming area by using a middle point of a vector length of the vector calculated by the vector calculation unit as a center, the image deforming area covering the operation start point and the operation end point, an area that starts from a start border that is a vertical line on which the operation start point is located and extends toward a vector direction of the vector to a border of the image deforming area being a contracted sub-area, and an area that starts from the start border that is the vertical line on which the operation start point is located and extends in a direction opposite to the vector direction of the vector, to another border of the image deforming area being a stretched sub-area;
a step value determining unit, configured to determine a pixel step value of each pixel in the image deforming area determined by the area defining unit, a pixel step value of a pixel in the contracted sub-area being greater than a preset step value threshold, a pixel step value of a pixel in the stretched sub-area being less than the step value threshold, and an integral value of the pixel step value in the contracted sub-area being equal to an integral value of the pixel step value of the pixel in the stretched sub-area;
a parameter generation unit, configured to generate an offset parameter relative to the image according to the vector direction of the vector calculated by the vector calculation unit and the pixel step value of the pixel that is determined by the step value determining unit; and
an interpolation calculation unit, configured to perform interpolation calculation on the offset parameter generated by the parameter generation unit, to obtain a stretched image.

10. The apparatus according to claim 9, wherein the step value determining unit comprises:
a first determining subunit, configured to determine a pixel step value of a pixel on a reference horizontal line, to obtain a reference pixel step value, wherein the reference horizontal line is a horizontal line on which the vector is located; and
a second determining subunit, configured to determine pixel step values of pixels on non-reference horizontal lines in the image deforming area according to the reference pixel step value determined by the first determining subunit, to obtain derivative pixel step values, wherein a derivative pixel step value in a vertical direction is less than or equal to the reference pixel step value.

11. The apparatus according to claim 10, wherein on the reference horizontal line, the integral value of the pixel step value in the contracted sub-area that is determined by the first determining subunit is equal to the integral value of the pixel step value of the pixel in the stretched sub-area, and is equal to the vector length of the vector calculated by the vector calculation unit.

12. The apparatus according to claim 11, wherein the first determining subunit is configured to fit a pixel step value curve by using a continuous function curve, to obtain the pixel step value of the pixel on the reference horizontal line.

13. The apparatus according to claim 10, wherein in the vertical direction, the derivative pixel step value determined by the second determining subunit is less than the reference pixel step value determined by the first determining subunit, and the second determining subunit is configured to: starting from a non-reference horizontal line neighboring to the reference horizontal line, determine the derivative pixel step values of the non-reference horizontal lines in turn according to a relationship of a decreasing function, wherein in the vertical direction, a non-reference horizontal line farther from the reference horizontal line indicates a smaller derivative pixel step value of the non-reference horizontal line, and a derivative pixel step value of a non-reference horizontal line that coincides with an upper border/a lower border of the image deforming area is 0.

14. The apparatus according to claim 13, wherein the second determining subunit is configured to use a decreasing function portion of a continuous function as the decreasing function.

15. The apparatus according to claim 9, wherein the area defining unit is configured to determine the image deforming area by using the middle point of the vector length of the vector as the center and a multiple of the vector length of the vector as the length and width or the radius, wherein the multiple is greater than 1.

16. The apparatus according to claim 9, wherein the parameter generation unit is configured to determine the vector direction of the vector as an offset direction of the pixel, wherein the offset parameter comprises the offset direction and the pixel step value of the pixel.

* * * * *